Feb. 6, 1940.  R. W. STORRS, JR  2,189,274
STOP
Filed Aug. 19, 1936
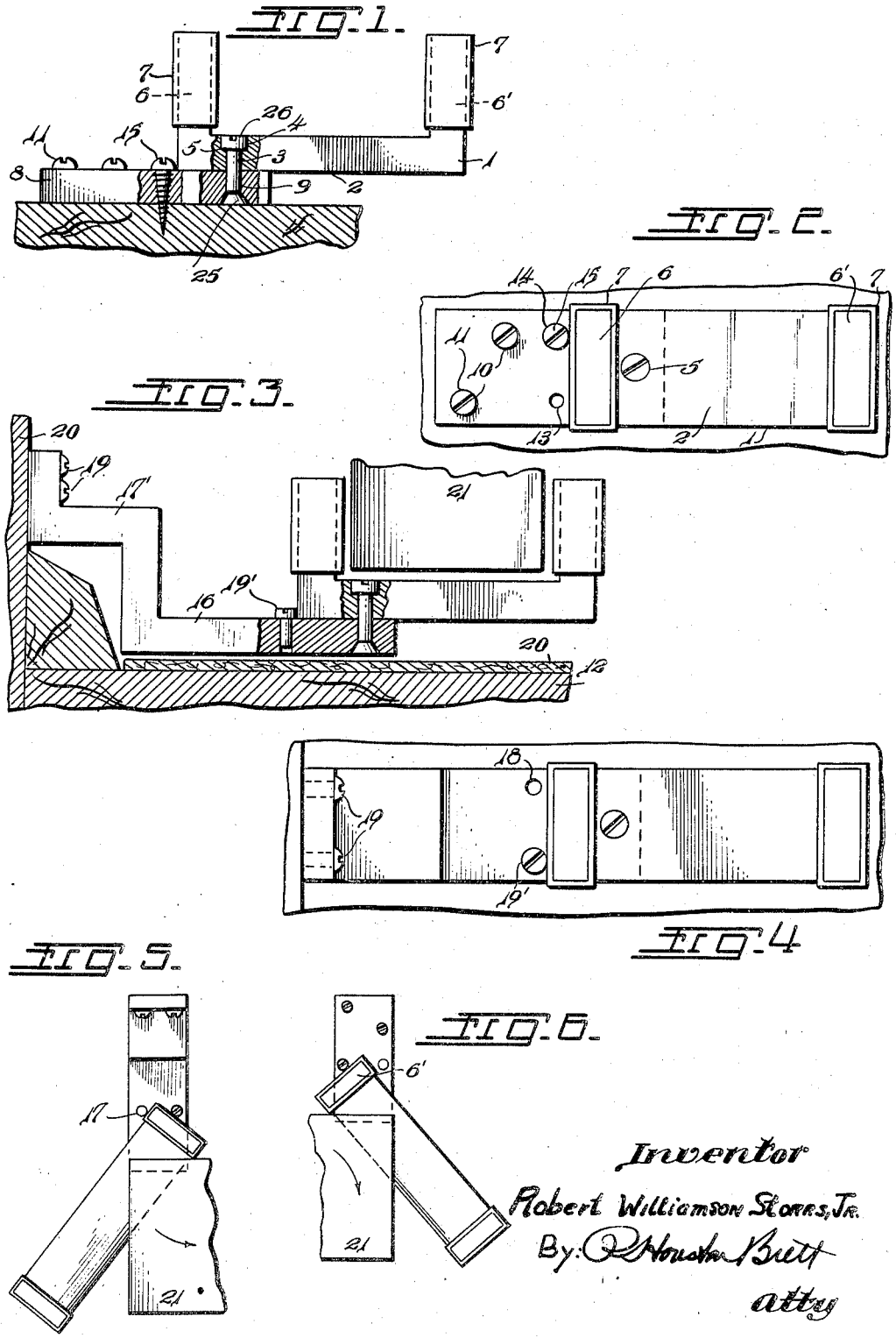
Inventor
Robert Williamson Storrs, Jr.
By: Houston Britt
atty Patented Feb. 6, 1940

2,189,274

UNITED STATES PATENT OFFICE 2,189,274

STOP

Robert Williamson Storrs, Jr., Richmond, Va.

Application August 19, 1936, Serial No. 96,753

1 Claim. (Cl. 292—216)

This invention relates to stops, and more particularly to devices used in stopping doors, certain types of windows and the like.

In a previous application filed by applicant August 26, 1935, Serial No. 37,785 for patent for a stop, the angular member on said stop had no means of limiting its rotatable movement, and one of the objects of this invention is to provide such a means.

Another object of this invention is the provision of a stop whereby the means limiting the angular member's movement also acts as securing means.

A further object is the provision of a stop provided with a removable pin; and said pin being adapted to limit the movement of the angular member.

Other objects and features will more fully appear from the following description and accompanying drawing, in which:

Fig. 1 is a sectional side view of the invention; Fig. 2 a top plan view of Fig. 1; Fig. 3 a sectional side view of a modification; Fig. 4 a top plan view of Fig. 3; Fig. 5 a diagrammatic view showing a positional view of Fig. 4 and 6 a similar view of Fig. 2.

Referring to the drawing, an angular member 1 is provided with a base 2 having an aperture 3 therein; said aperture has a seat 4 into which a rivet 5 is disposed. Arms 6—6' are secured to said base in spaced relation with respect to each other; said arms and base forming a substantial U-shaped member. Resilient members 7 are respectively disposed on said arms so as to prevent the latter from scarring any object they may contact and also to minimize noise that may be caused by contact of an object with said arms.

A bearing 8 has an orifice 9 therein, the rivet 5 engaging said base and bearing, through the aperture and orifice, thereby securing the bearing and angular member pivotally together.

Holes 10 are disposed in said bearing and adapted to accommodate screws 11 that secure the bearing to a floor 12 or other support.

Holes 13 and 14 are also provided to accommodate a stop screw 15, that not only serves to limit the movement of the angular member in clock-wise or anti-clock-wise movement but also acts to secure said bearing in similar fashion as screws 11.

It will be noted that screw 15 is adapted to be used in either hole 13 or 14, depending on whether the door opens from the right or left side. For instance in Fig. 5 the door opens from the left side as indicated by arrow showing pivotal movement; while Fig. 6 shows a door that opens from the right side, as indicated by arrow showing pivotal movement of door. Of course, when the door is forced against the arm 6' it automatically throws the angular member in a position perpendicular to said door and thereby locks it.

The stop screw acts, as hereinbefore stated, to limit the rotatable movement in clock-wise or anti-clock-wise direction. By providing this screw one can (if the angular member has been thrown from the normal position that permits the door to enter the angular member for automatic securement) merely move the angular member until it engages the stop-screw; this will insure the proper position for operation of the device, whereas without such stop-screw, the operative is constrained to resort to guessing the proper position of the angular member.

In the modification shown in Fig. 3 the device functions the same except that a bearing 16 is provided with an offset 17' having apertures 18 therein adapted to accommodate screws 19 that secure said bearing to a wall 20 or the like.

The bearing 16 is provided with apertures 17 and 18 that are adapted to accommodate a pin 19' that is removable so as to be placed in either of said apertures, depending upon the manner a door or window opens, as hereinbefore explained. The pin serves the same purpose as does the stop-screw 15, hereinbefore described except with respect to securement.

The modification is generally used where it will be inconvenient to secure the device to a floor, and also where it is desired to have a rug 20 under the device and without said rug being marred by screws or the like. The device shown in the modification is generally secured to a wall or base board.

The resilient members are adapted to slip over the arms and may be removed by slipping them from said arms.

Doors 21, in section, are shown in the various figures to better illustrate the invention.

The rivet is provided with a spread 25 that flushes with the basic surface of said bearing; while the other end of said rivet is provided with a head 26 that is disposed in said seat.

Having described this invention, what is claimed is:

A device of the character described consisting of a base; arms respectively extending from said base; a bearing, an aperture centrally disposed in and near one end of said base; an orifice in said bearing adapted to register with said aperture; a rivet connecting said base and bearing in pivotal fashion, and a stop screw disposed in said bearing adjacent the apertured end of the base for engagement with the end face of said end only of said base so as to limit movement of the latter in two directions.

ROBERT WILLIAMSON STORRS, Jr.